United States Patent [19]
Oda et al.

[11] Patent Number: 6,152,640
[45] Date of Patent: Nov. 28, 2000

[54] BALL JOINT

[75] Inventors: Takahiro Oda; Keiichiro Suzuki, both of Hamana-gun, Japan

[73] Assignee: Kabushiki Kaisha Somic Ishikawa, Japan

[21] Appl. No.: 09/209,142

[22] Filed: Dec. 10, 1998

[30] Foreign Application Priority Data

Dec. 12, 1997 [JP] Japan .................................. 9-342590

[51] Int. Cl.$^7$ ..................................................... F16C 11/06
[52] U.S. Cl. ........................... 403/133; 403/135; 403/140
[58] Field of Search ..................................... 403/122, 132, 403/133, 134, 135, 137, 138, 140

[56] References Cited

U.S. PATENT DOCUMENTS

| | | | |
|---|---|---|---|
| 1,976,983 | 10/1934 | Chandler | 403/137 |
| 2,527,787 | 10/1950 | Berger | 403/138 X |
| 2,757,029 | 7/1956 | Latzen | 403/140 |
| 3,945,739 | 3/1976 | Abe | 403/138 |
| 5,067,841 | 11/1991 | Fukukawa et al. | 403/140 |
| 5,188,477 | 2/1993 | Idosako et al. | 403/133 |
| 5,509,748 | 4/1996 | Idosako et al. | 403/133 |
| 5,795,092 | 9/1998 | Jaworski et al. | 403/133 X |

*Primary Examiner*—Lynne H. Browne
*Assistant Examiner*—David E. Bochna
*Attorney, Agent, or Firm*—Morrison Law Firm

[57] ABSTRACT

Sliding contact portions on an inner surface of a bearing seat slidably support a ball head of a ball stud in a housing. Spaces between one or more of the sliding contact portions contain lubricant reserves. Load receiving portions on the outer surface of the bearing seat facing the housing also support the load placed on the ball stud. Protruding portions on the sliding contact portions decrease contact surface area and permit lubricant to cover nearly the entire ball head surface. The load receiving portions and sliding contact portions, including the protruding portions, deform to absorb repeated heavy loads while maintaining friction compensation and stable torque. The ball joint has an improved ability to compensate for dimensional tolerances, which facilitates component manufacture. The load withstanding ability, lubrication efficiency and durability of the ball joint are thus improved.

19 Claims, 5 Drawing Sheets

BALL JOINT

BACKGROUND OF THE INVENTION

The present invention relates to a ball joint including a housing, a ball stud, and a bearing seat. The ball stud has a ball head portion integrally formed with a stud portion and the bearing seat slidably envelops the ball head portion of the ball stud. The ball stud and bearing seat combination is placed into an inner chamber of the housing through an opening. A lubricant introduced into the inner chamber of the housing permits the ball head portion to slide within the bearing seat.

Japanese Patent Laid-open No. 1995-269557 discloses an example of the type of ball joint described above.

The ball joint disclosed in Japanese Patent Laid-open No. 1995-269557 includes a bearing seat composed of material that is both elastic and rigid. A plurality of load receiving portions and indented portions are formed on the outer surface of the bearing seat that faces the inner chamber of the housing. The load receiving portions and the indented portions are formed alternately and adjacent with each other, and the load receiving portions contact the bottom portion of the inner chamber of the housing. The points of contact between the load receiving portions and the bottom portion of the housing are different radial distances from the center of the bearing seat. The indented portions are separated a given distance from the bottom portion of the housing.

The bearing seat also includes a sliding portion and a space portion formed on the inner cylindrical surface of the bearing seat. The sliding portion of the bearing seat contacts the ball head portion of the ball stud, while the space portion provides a clearance between the ball head portion and the bearing seat. Thus, the bearing seat slidably envelops the ball head portion of a ball stud placed in the bearing seat.

The bearing seat is placed in the inner chamber of the housing so that the load receiving portions of the bearing seat contact the bottom portion of the housing. The ball stud is placed in the bearing seat with the ball head portion abutting the sliding portion. The load receiving portions and sliding portions form indented and space portions between the housing and the ball head portion, respectively. A load applied to the ball joint causes the bearing seat to elastically deform due to the presence of the indented portions and the space portions. The elastic restoring force that results from the deformation creates a pushing energy on the ball head portion. The pushing energy and elasticity of the bearing seat allows the ball joint to provide friction compensation while absorbing dimensional tolerances of the components. The elastic deformation also helps to absorb a heavy load, thereby increasing the load withstanding capability and durability of the ball joint.

The conventional ball joint described in Japanese Patent Laid-open No. 1995-269557 has the entire surface of the bearing seat except for the space portion in close contact with the ball head portion. In this configuration, it is difficult for the lubricant to flow between the bearing seat and the ball head portion. For this reason, there is a demand for a configuration which enables the lubricant to efficiently spread over nearly the entire surface between the bearing seat and the ball head portion. The configuration should permit the ball head portion to slide more easily due to increased lubrication, while maintaining stable torque and friction compensation.

A space portion which occupies virtually the entire surface of the bearing seat is impractical. While such a configuration would permit a lubricant to spread over nearly the entire surface between the bearing seat and the ball head portion, the ball head portion would rattle within the bearing seat. Moreover, this arrangement would make frictional compensation and absorption of dimensional tolerances impossible.

OBJECTS AND SUMMARY OF THE INVENTION

In order to solve the above problem, an object of the present invention is to provide a ball joint which permits a lubricant to spread efficiently over nearly the entire ball head portion. The ball head can then slide more easily without detracting from the capacity of the ball joint for friction compensation, absorption of dimensional tolerances or its ability to withstand loading.

Briefly stated, the present invention provides sliding contact portions on an inner surface of a bearing seat that slidably support a ball head of a ball stud in a housing. Spaces between one or more of the sliding contact portions contain lubricant reserves. Load receiving portions on the outer surface of the bearing seat facing the housing also support the load placed on the ball stud. Protruding portions on the sliding contact portions decrease contact surface area and permit lubricant to cover nearly the entire ball head surface. The load receiving portions and sliding contact portions, including the protruding portions, deform to absorb repeated heavy loads while maintaining friction compensation and stable torque. The ball joint has an improved ability to compensate for dimensional tolerances, which facilitates component manufacture. The load withstanding ability, lubrication efficiency and durability of the ball joint are thus improved.

According to an embodiment of the invention, there is provided a ball joint comprising: a housing having an inner chamber therein, the inner chamber including an opening, a bearing seat in the inner chamber of the housing and having an insertion hole, a ball stud having a ball head portion adapted to be slidably enveloped by the bearing seat and a stud portion integrally formed with the ball head portion and projecting from the insertion hole, a plurality of sliding contact portions protruding inward from an inner cylindrical surface of the bearing seat, the plurality of sliding contact portions being aligned substantially on a circle surrounding the ball head portion, spaces between the sliding contact portions forming clearances between the bearing seat and the ball head portion adapted to contain lubricant, and the bearing seat being of a material having a resilience sufficient to permit the bearing seat to elastically flex and compress when heavily loaded.

According to a feature of the invention, there is provided a bearing seat comprising: an inner surface of the bearing seat being deformable into a generally spherical shape to accommodate a ball head portion of a ball stud, a plurality of inward protrusions on the inner surface to form spaced-apart sliding contacts with the ball head portion, spaces between the sliding contacts being effective to retain a lubricant, and an outer surface of a bottom of the bearing seat including a plurality of radially disposed spaced-apart load receiving portions adapted for transmitting load forces to a housing containing the bearing seat.

According to another feature of the invention, there is provided a housing comprising: an inner chamber within the housing, the inner chamber including an opening, an outward step portion formed on an inner wall of the opening, a bearing seat contained within the inner chamber, the housing being crimped near the opening to retain the bearing seat, and the outward step forming a clearance buffer between an outer wall of the bearing seat and the inner wall.

A ball joint according to the invention includes a housing, a ball stud that has a ball head portion and a stud portion, and a bearing seat. The housing is roughly cylindrical, and includes an opening on one end leading to an inner chamber. The material used to construct the bearing seat is both rigid and flexible, as with a synthetic resin, for example. The ball head portion and stud portion of the ball stud are integrally formed, with the ball head portion adapted to slide within the bearing seat. The ball head portion of the ball stud is inserted into the bearing seat through an insertion hole located at one end of the bearing seat. The bearing seat slidably envelops the ball head portion of the ball stud placed therein. A fluid lubricant interposed between the ball head portion and the bearing seat permits the ball head portion to slide easily. The slidably enveloped ball head portion of the ball stud together with the bearing seat are placed within the inner chamber of the housing. In the above arrangement, the stud portion of the ball stud projects from the insertion hole of the bearing seat, and then from the opening of the housing.

The bearing seat includes a plurality of sliding contact portions on the inner cylindrical surface of the bearing seat that faces the ball head portion. The sliding contact portions are located in different latitudinal zones with respect to an axis formed, for example, in the direction in which the ball stud is inserted. The locations where the sliding contact portions come into contact with the ball head portion are aligned virtually on a circle surrounding the ball head portion. The bearing seat also has at least one space portion situated between two or more of the sliding contact portions so as to form a clearance or clearances between the bearing seat and the ball head portion. The space portion which forms the clearances contains the lubricant that allows the ball head portion to slide more easily.

At least one of the sliding contact portions includes a plurality of protruding portions arranged along substantially the same latitude with respect to an axis formed, for example, in the direction in which the ball stud is inserted. The protruding portions extend toward the ball head portion so that the end of each protruding portion is in contact with the ball head portion. Placing the assembly of the ball head portion and the bearing seat into the inner chamber of the housing brings the sliding portions into contact with the ball head portion. The sliding portions in contact with the ball head portion permit the ball head portion to slide on the bearing seat.

When a load is applied to the ball joint of the above configuration, elastic deformation of the sliding contact portions creates a pushing energy on the ball head portion. This pushing energy is generated by the restoring force derived from the elastically deformed sliding contact portions. The elasticity and rigidity of the sliding portions in this configuration gives the ball joint the feature of friction compensation. Moreover, the bearing seat in this configuration allows the ball joint to compensate for the dimensional tolerances of the components.

Elastic deformation of the sliding contact portions, together with flexure of the portions therebetween, provide the ball joint in the configuration above with the ability to withstand the application of a heavy load. Thus, the load capacity and the durability of the ball joint can be increased.

Moreover, this configuration achieves a further reduction in the contact surface area between the bearing seat and the ball head portion. Reduced contact surface area is attained when the structure of at least one of the sliding contact portions includes a plurality of protruding portions. The protruding portions extend towards the ball head portion and are arranged along nearly the same latitude with respect to an axis formed, for example, in the direction in which the ball stud is inserted. The ball head portion contacts the bearing seat at the ends of the protruding portions resulting in decreased contact surface area. The decreased contact surface area reduces the frictional resistance between the ball head and the bearing seat, which in turn reduces the ball joint torque.

Gaps between the protruding portions described above form clearances between the ball head portion and the bearing seat. The lubricant reserved between the sliding contact portions can enter the gaps between the protruding portions and fill the entire space portion between the ball head portion and the bearing seat. The lubrication area of the ball head portion is thereby increased, allowing the ball head portion to slide more easily.

In addition to the configuration described above, the ball joint may have at least some of the protruding portions formed in a rounded shape. Furthermore, the ball joint may have all of the protruding portions formed in a rounded shape. Protruding portions formed in a rounded shape that constitute at least one of the sliding contact portions engage the ball head portion as a point-contact. When a number or all the protruding portions are rounded, the ball joint of the invention has substantially decreased contact area between the bearing seat and the ball head. The decrease in contact area reduces torque, thereby permitting the ball head portion to slide more easily. Furthermore, when a heavy load is applied to the ball joint, the protruding portions are compressed to form a surface-contact with the ball head portion. The surface-contact formed on the deformed protruding portions absorbs the heavy load and maintains the load capacity and the durability of the ball joint.

Moreover, a ball joint with the above configuration permits a lubricant to spread efficiently over the ball head portion which enables the ball joint to slide more easily. This gain in operating performance occurs without a decrease in the capacity of the ball joint for friction compensation, compensation for dimensional tolerances or ability to withstand loading.

The above, and other objects, features and advantages of the present invention will become apparent from the following description read in conjunction with accompanying drawings, in which like reference numerals designate the same element.

DETAILED DESCRIPTION ON THE PREFERRED EMBODIMENT

Figure 1:
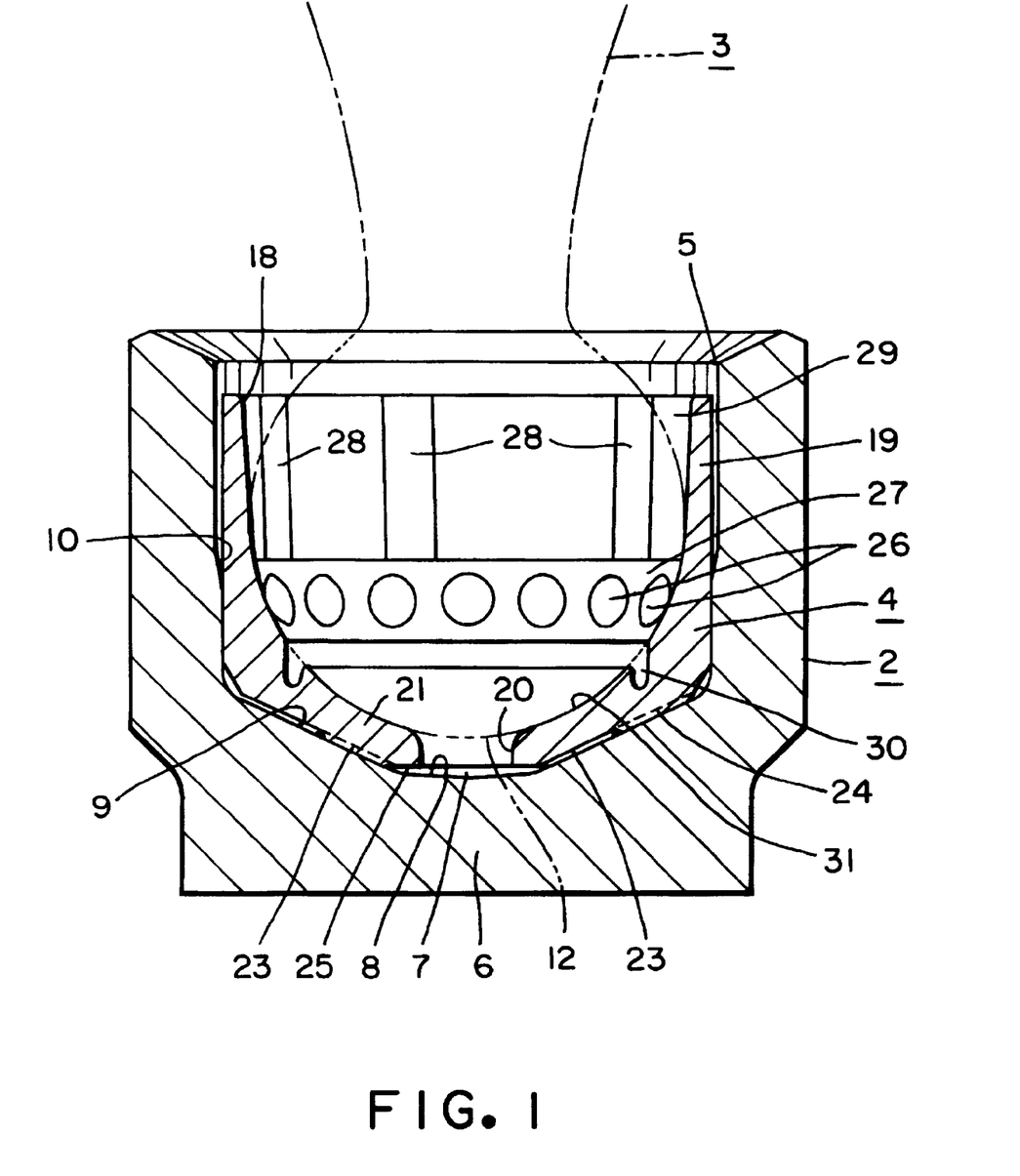
FIG. 1 is a cross section view of a housing and bearing seat according to an embodiment of the present invention.
Figure 2:
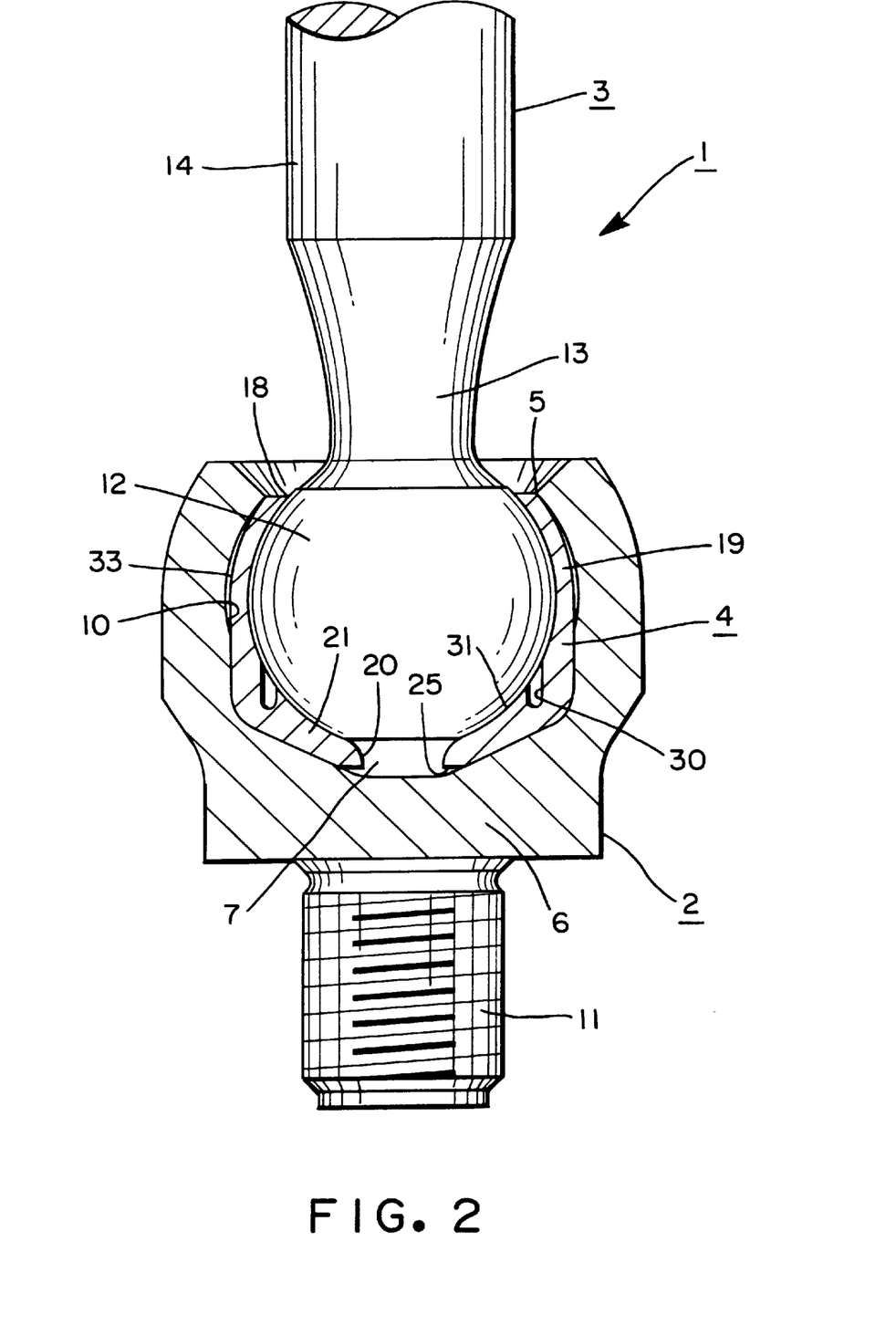
FIG. 2 is a cross section view of a ball joint according to an embodiment of the present invention.
Figure 3:
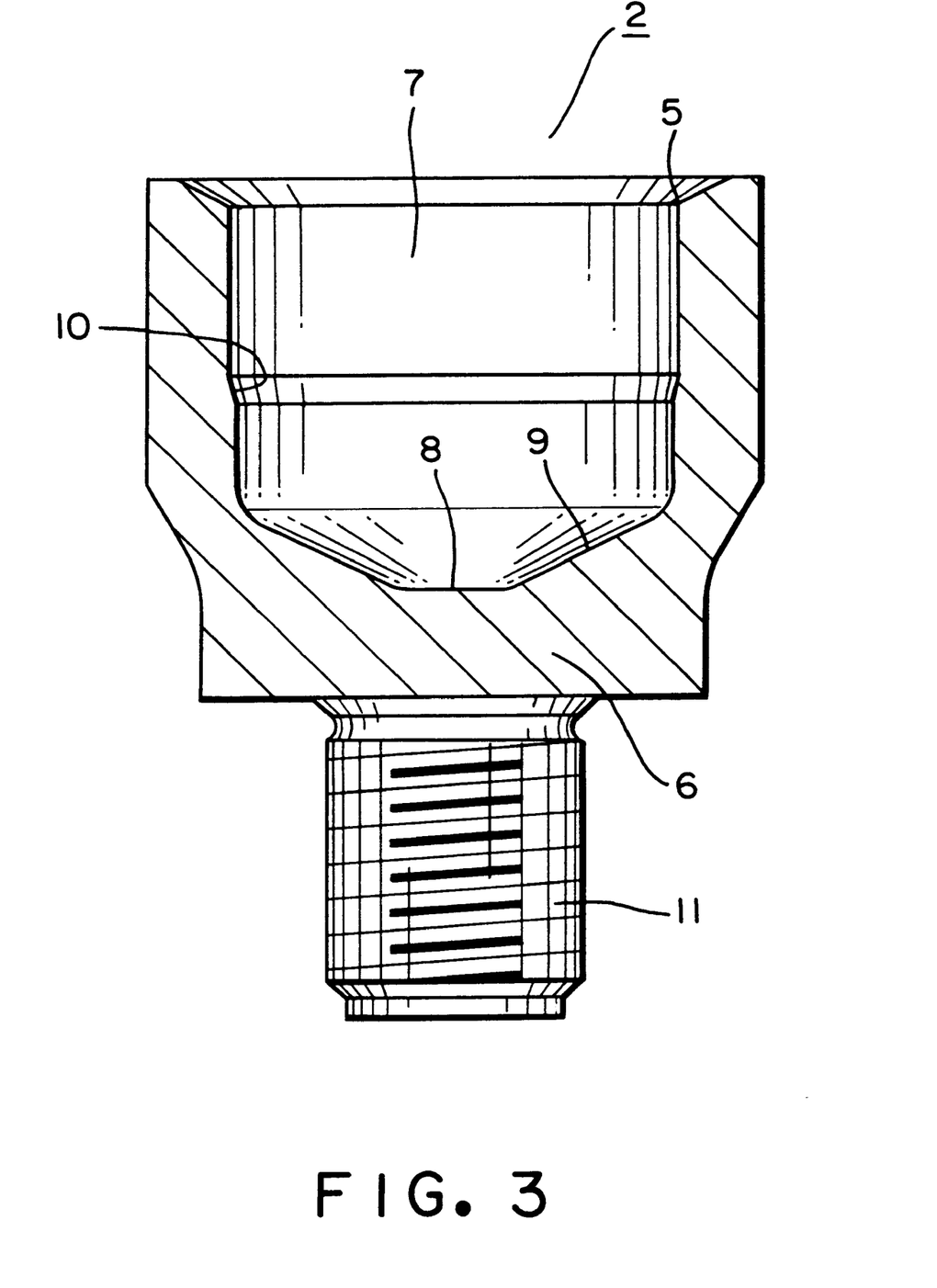
FIG. 3 is a cross section view of the housing of FIG. 1 before it is assembled in a ball joint.

Referring to FIGS. 1 through 3, a ball joint 1 includes a metal cylindrical housing 2, a metal ball stud 3 and a bearing seat 4 made of synthetic resin. The ball joint 1 may be used in the steering system or the suspension mechanism of an automobile, especially at the rack shaft end of the tie rod of a rack-and-pinion steering device.

The housing 2 has an opening 5 and an inner chamber 7, which has a bottom portion 6 located opposite the opening 5. The inner chamber 7 has a generally cylindrical shape with a bottom before it is assembled in a ball joint. A conical face portion 8 is an approximately conical indentation that is formed at the center of the bottom portion 6 of the inner chamber 7 of the housing 2. A generally arc-shaped seating face portion 9 is formed around the conical face portion 8 as an integral, continuous body therewith. A step portion 10 is formed around the wall of the opening 5 with a diameter that tapers outward toward the opening 5. An external threaded portion 11 projects downward from the center of the underside of the bottom portion 6.

The ball stud 3 includes a ball head portion 12, a small diameter portion 13 and a stud portion 14, all of which are integrally formed. The small diameter portion 13 is located between the ball head portion 12 and the stud portion 14. An external threaded portion (not shown) is formed around the outer surface of the upper end of the stud portion 14.

The bearing seat 4 is fitted within the housing 2 of the ball stud 1. The material from which the bearing seat 4 is formed can withstand high loads and has superior bearing characteristics due to its rigidity and flexibility. Examples of such materials include polyacetal resins or other hard synthetic resins.

Referring now to FIGS. 1 through 7, the bearing seat 4 includes a cylindrical body 19 and an insertion hole 18 formed at one end to permit the ball head portion 12 of the ball stud 3 to be inserted therethrough. A bottom 21 having a slide hole 20 is formed at the bottom end of the cylindrical body 19. The slide hole 20 is formed at the approximate center of the bottom 21 with a diameter smaller than that of the ball head portion 12. With the configuration as above, the bearing seat 4 is in a generally cylindrical shape with a bottom before it is assembled in a ball joint.

Figure 6:
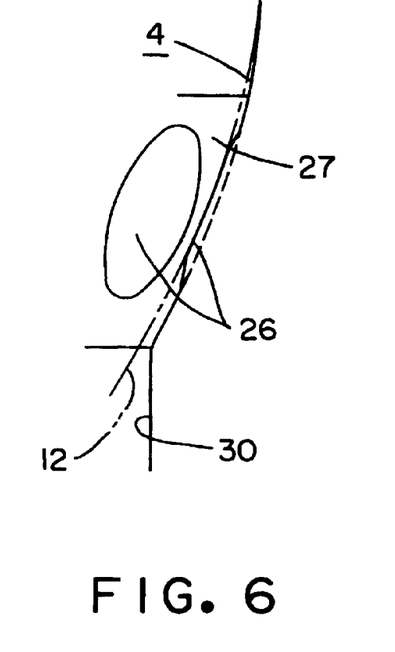
FIG. 6 is a partially cutout sectional side elevation of the bearing seat.

The portion of the inner wall of the cylindrical body 19 near the insertion hole 18 is formed with an outward flare toward the insertion hole 18. The slanted portion of the inner wall extends from a circumferential line that corresponds with the equator of the ball head portion 12 to the insertion hole 18. The above described equator is in a plane that is parallel to the plane formed by insertion hole 18. The portion of the inner wall of the cylindrical body 19 that ranges from the above described equator to the inner surface of the bottom 21 is in the shape of a rounded concave. Close contact between the ball head portion 12 and the inner surface of the bottom 21 is achieved by adapting the curvature of the rounded concave shape to be nearly identical to that of the ball head portion 12. The step portion 10 on the wall of the opening 5 is at a location where it virtually corresponds to the above described equator of the ball head portion 12.

Figure 5:
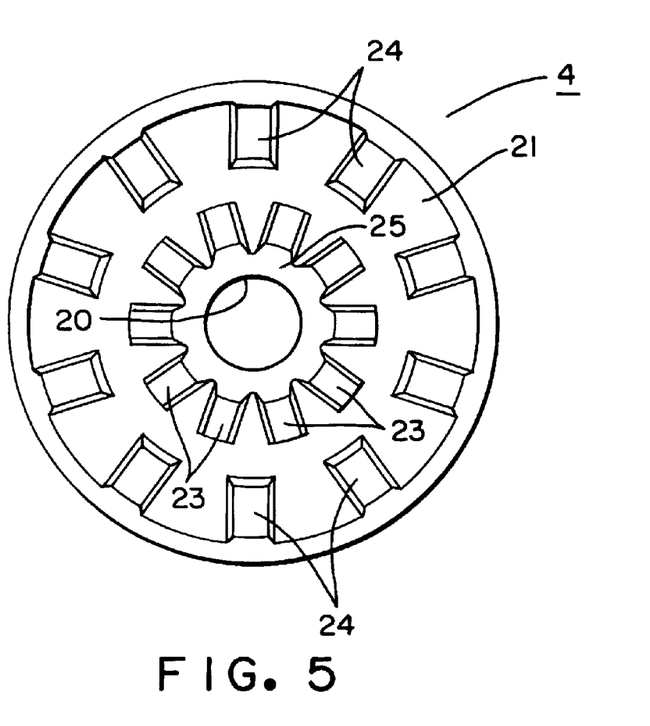
FIG. 5 is a bottom view of the bearing seat.

A plurality of first load receiving portions 23 and a plurality of second load receiving portions 24 are formed on the outer surface of the bottom 21 of the bearing seat 4. The first load receiving portions 23 and second load receiving portions 24 protrude outward from the outer surface of the bottom 21 and contact the seating face portion 9 of the bottom portion 6. The first load receiving portions 23 and the second load receiving portions 24 are radially arranged around the circumference of concentric circles with different diameters. In other words, the first load receiving portions 23 and the second load receiving portions 24 are located in different latitudinal zones with respect to an axis formed, for example, in the direction in which the ball head portion 12 is inserted through the insertion hole 18. The first load receiving portions 23 and the second load receiving portions 24 protrude to form clearances between the bearing seat and the seating face portion 9. These clearances are in the shape of a groove with an aperture that is a given distance, e.g. 0.3 mm, from the bottom portion 6 of the housing 2. A buffer surface portion 25 is formed around the edge of the slide hole 20 of the bottom 21. The buffer surface portion 25 faces the conical face portion 8 with a given distance therebetween.

Figure 4:
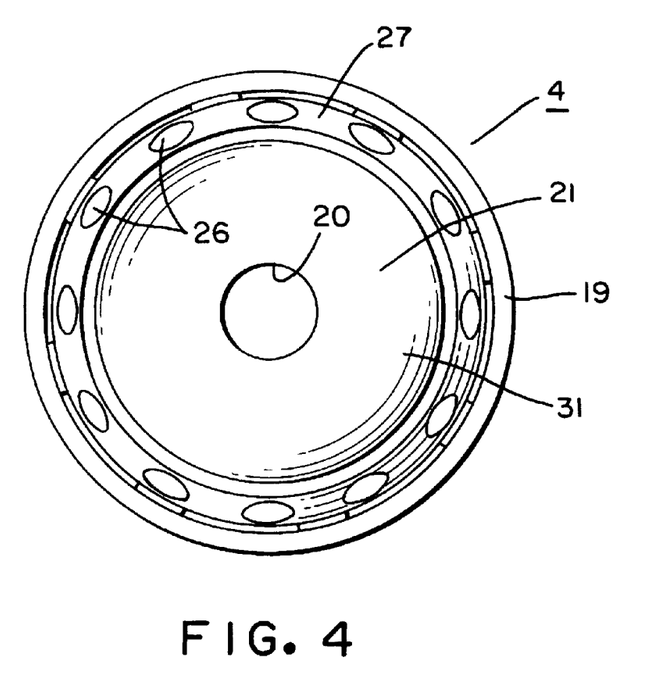
FIG. 4 is a top view of the bearing seat.
Figure 7:
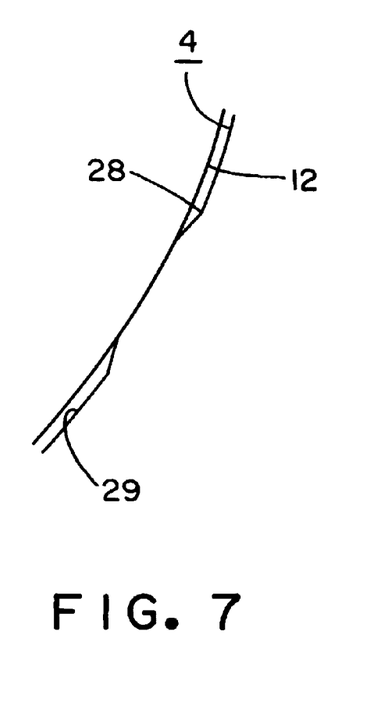
FIG. 7 is a partially cutout horizontal sectional view of the bearing seat.

A first sliding contact portion 27 formed around the inner surface of the cylindrical body 19 is located below the circumferential line corresponding to the equator of the ball head portion 12. The first sliding contact portion 27 includes a plurality of rounded first protruding portions 26 that extend from the inner surface of the cylindrical body 19 toward the ball head portion 12. The first protruding portions 26 are arranged along a given latitude with respect to an axis formed, for example, in the direction in which the ball stud is inserted. The ends of the first protruding portions 26 extend toward and contact the surface of the ball head portion 12.

A second sliding contact portion 29 is formed around the inner surface of the cylindrical body 19, at a location above the circumferential line corresponding to the equator of the ball head portion. The second sliding contact portion 29 includes a plurality of second protruding portions 28 that have a generally trapezoidal cross section. The second protruding portions 28 extend outward from the inner surface of the cylindrical body 19 toward the surface of the ball head portion 12. The second protruding portions 28 are arranged in a different latitudinal zone than that of the first protruding portions 26. The ends of the second protruding portions 28 extend towards and contact the surface of the ball head portion 12. The first protruding portions 26 on the first sliding contact portion 27 and the second protruding portions 28 on the second sliding contact portion 29 protrude to form clearances between the bearing seat and the ball head portion 12. These clearances are in the shape of a groove with an aperture that is a given identical distance from the cylindrical surface 19 of the housing 2.

A space portion 30 which extends in the circumferential direction and opens toward the insertion hole 18 is formed between the first sliding contact portion 27 and the inner surface of the bottom 21. The inner surface of the bottom 21 of the bearing seat 4 forms a third sliding contact portion 31. The third sliding contact portion 31 is formed in the shape of a semispherical indentation having nearly the same curvature as that of the ball head portion 12.

In the above configuration, the bearing seat 4 is placed in the inner chamber 7 of the housing 2 with the bottom 21 adjacent to the seating face portion 9. The ball head portion 12 of the ball stud 3 is then placed into the bearing seat 4. The portion around the opening 5 of the housing 2 is then crimped inward, together with the portion of the bearing seat 4 near the end of the cylindrical body 19 where the insertion hole 18 is formed. Thus, the ball head portion 12 of the ball stud 3 is slidably contained within the bearing seat.

Lubricating oil (not shown) is introduced between the ball head portion 12 and the bearing seat 4 in the ball joint 1. A part of the lubricating oil is retained in the space portion 30. Lubricating oil is also contained in the clearances formed between the first protruding portions 26 and the second protruding portions 28 and the surface of the ball head portion 12. The space in the sliding hole 20 between the ball head portion 12 and the bottom portion 6 of the housing 2 also contains lubricating oil.

The ball joint 1 also has a clearance formed between the outer surface of the bearing seat 4 and the inner surface of the housing 2. The clearance is located above the step portion 10 and serves as a buffer portion 33.

An explanation for assembling of the embodiment described above follows hereunder.

First, the bearing seat 4 is inserted through the opening 5 into the inner chamber 7 of the housing 2. With the bearing seat 4 fully inserted, the first load receiving portions 23 and the second load receiving portions 24 on the bottom 21 of the bearing seat 4 contact the seating face portion 9 of the bottom portion 6. The buffer portion 25 of the bottom 21 faces the conical face portion 8 of the bottom portion 6 of the housing 2 at a specified distance therefrom.

The head portion 12 of the ball stud 3 is then forced through the insertion hole 18 into the bearing seat 4 until the ball head portion 12 contacts the bottom 21 of the bearing seat 4. The edge of the opening 5 of the housing 2 is then crimped inward to retain the head portion in place. The ball joint 1 is thus assembled with the bearing seat 4 slidably enveloping the ball head portion 12 of the ball stud 3.

In the assembled state, the ball joint 1 has several clearances formed between the outer surface of the bearing seat 4 and the inner surface of the housing 2. The buffer portion 33 forms a clearance located above the step portion 10. The location of the buffer portion 33 corresponds to the equator of the ball head portion 12. First and second load receiving portions 23 and 24 also form clearances between the bottom 21 of the bearing seat 4, and the seating face portion 9. The regions of the bearing seat 4 where clearances are formed between the ball head portion 12 and the seating face portion 9 are slightly flexed. The first protruding portions 26, the second protruding portions 28 and the third sliding contact portion 31 are all slightly deformed where they contact the ball head portion 12. The contact areas between the ball head portion 12 and the bearing seat 4 are all slightly flattened when elastically deformed.

An explanation of the function of the embodiment described above follows hereunder.

In the assembled ball joint 1, the ball head portion 12 is slidably enveloped within the bearing seat 4. The crimped edge of the opening 5 of the housing 2 applies an inward force, through the bearing seat 4, to the ball head portion 12. The force applied to the bearing seat is exerted on the first protruding portions 26 of the first sliding contact portion 27, the second protruding portions 28 of the second sliding contact portion 29 and the third sliding contact portion 31. These areas are the locations where the bearing seat 4 contacts the ball head portion 12. The application of this force results in elastic deformation of the bearing seat 4 where it contacts the ball head portion 12. The elastic deformation of the bearing seat 4 applies a pushing energy in the form of a restoring force to the ball head portion 12. The elasticity of the bearing seat 4 and the restoring force it provides allow the ball joint 1 to compensate for dimensional tolerances of the components.

When a heavy load is applied to the ball stud 3, the bearing seat 4 elastically flexes and deforms to support the load. Elastic deformation occurs at the locations where the seating face portion 9 and the ball head portion 12 contact the bearing seat 4. Contact between the bearing seat 4 and the ball head portion 12 occurs at the ends of the first protruding portions 26, the ends of the second protruding portions 28, and at the third sliding contact portion 31. Elastic flexure occurs at portions of the bearing seat 4 where clearances are formed between the bottom 21 and the seating face portion 9, and between the inner surface of bearing seat 4 and the ball head portion 12. The clearances are defined by the space between first and second load receiving portions 23 and 24 respectively, and also by the space defined by the sliding contact portions 27, 29, and 31. Elastic flexure of the above portions of the bearing seat 4 together with elastic deformation of the above contact locations permits the heavy load to be absorbed by the entire bearing seat 4. The embodiment of the ball joint 1 is thus able to absorb a heavy load, which ensures increased durability and load withstanding capability. The embodiment of the ball joint 1 also compensates for dimensional tolerances when heavily loaded.

The ball head portion 12 contacts the bearing seat at sliding contact portions 27, 28, and 31 of the bearing seat 4. The first sliding contact portion 27 includes the first protruding portions 26, and the second sliding contact portion 29 includes the second protruding portions 28. The third sliding contact portion 31 is in contact with the ball head portion 12 over a band-like surface extending along nearly the same latitude. The first sliding contact portion 27 and the second sliding contact portion 29 are virtually in either line-contact or point-contact with the ball head portion. The line-contact or point-contact results in decreased contact area and therefore decreased frictional resistance between the ball head portion 12 and the bearing seat 4. Decreased frictional resistance indicates that the torque of ball joint 1 is reduced and therefore stabilized. Decreased contact area between the ball head portion 12 and the bearing seat 4 also allows the lubricating oil to cover nearly the entire surface of the ball head portion 12, which enables the ball head portion to slide more easily.

As described above, the embodiment of the ball joint 1 absorbs dimensional tolerances of the components even if it receives a heavy load. Therefore, the embodiment is capable of improving the durability and the load withstanding ability of the ball joint 1. In addition, the reduction in the contact surface provides a stable torque, and the lubricant covering nearly the entire surface of the ball head portion improves its sliding capability.

The first protruding portions 26 may be formed to protrude in a rounded shape and contact the ball head portion 12 in a point-contact. The point-contact further decreases the contact surface area between the bearing seat 4 and the ball head portion 12. The decreased contact surface area results in reduced torque and allows the ball head portion to slide more easily. When a heavy load is applied, the first protruding portions 26 are elastically deformed so that they are in surface-contact with the ball head portion 12. Increased contact surface area between the bearing seat 4 and the ball head portion 12 results in increased load absorption of the ball joint 1. The ball joint 1 is thereby able to withstand the application of a heavy load. The above configuration thus provides improved load withstanding ability and durability.

The contact surface area between the bearing seat 4 and the ball head portion 12 is greatest at the third sliding contact portion 31, less at the second sliding contact portion 29, and smallest at the first sliding contact portion 27. The third sliding contact portion 31 has the greatest contact surface area because it is the portion of the bearing seat 4 that is most likely to receive the greatest load. This feature contributes to improving the load withstanding capability of the ball joint.

The second protruding portions 28 of the second sliding contact portion 29 may be formed in the shape of a strip. The second protruding portions 28 withstand loading of the ball joint 1 in the case where the ball stud 3 and the housing 2 are pulled away from each other. When the ball joint 1 is loaded in this fashion, the ball head portion 12 no longer contacts the third sliding contact portion 31. The resulting gap between the ball head portion 12 and the sliding contact portion 31 permits the lubricating oil to spread over a large area of the surface of ball head portion 12. The above described embodiment contributes to reducing the torque of the ball joint 1. Moreover, the small surface contact area between the first protruding portions 26 and the ball head portion 12 permits the lubricating oil to thoroughly spread over the ball head portion 12 and thereby stabilizes the torque. When the ball joint 1 is heavily loaded, the third sliding contact portion 31 is elastically compressed. The first sliding contact portion 27 is also compressed, and contributes support for the load, reducing the load imposed on the third sliding contact portion 31.

The housing 2 includes a step portion 10 formed on the wall of opening 5. When the housing 2 is crimped to assemble the ball joint 1, a buffer portion 33 is formed between the outer surface of the bearing seat 4 and the inner surface of the housing 2. The location of the buffer portion 33 corresponds to the equator of the ball head portion 12. When a heavy load is applied to the ball joint 1, the bearing seat 4 can flex near the buffer portion 33. The flexure of the bearing seat 4 near the buffer portion 33 reduces the torque of ball joint 1. The buffer portion 33 also helps to distribute stress applied to the bearing seat 4, preventing excessive flexure or deformation. Therefore, the entire bearing seat 4 contributes to supporting and efficiently absorbing the heavy load.

The above described embodiment decreases the contact surface area between the ball head portion 12 and the bearing seat 4. The decrease in contact surface area increases the load imposed on the sliding contact portions 27, 29, and 31 of the bearing seat 4 when a heavy load is applied to the ball joint 1. The increased load is absorbed by elastic flexure of portions of the bearing seat 4 where clearances between the bottom 21 and the seating face 9 are formed, and also near the buffer portion 33. The increased load is also absorbed by elastic deformation of the first load receiving portions 23 and the second load receiving portions 24. The heavy load is therefore distributed, absorbed and supported by the entire bearing seat 4. This feature of the invention ensures sufficient load absorption that increases the load withstanding ability and the durability of the ball joint.

The above described invention has three locations where the bearing seat 4 contacts the ball head portion 12. It should be understood that the number of locations where the bearing seat 4 may be in contact with the ball head portion 12 can be set at any desired number.

The above described invention also discloses that the sliding contact portions 27 and 29 include a plurality of protruding portions 26 and 28, respectively. It should be understood that it is sufficient for the operation of the ball joint 1 that any one or more of the sliding contact portions 27, 29 or 31 may include a plurality of protruding portions.

The above described invention also discloses that solely the first protruding portions 26 of the first sliding contact portion 27 are formed in a rounded shape. It should be understood that the second protruding portions 28 of the second sliding contact portion 29 may also be formed in a rounded shape. Furthermore, either a part or all of the first protruding portions 26 may have a generally trapezoidal cross section, similar to that of the second protruding portions 28.

Furthermore, a plurality of space portions similar to the space portion 30 may be included in the bearing seat 4 of the ball joint 1.

According to the configuration of a ball joint of the invention, a plurality of sliding contact portions are formed on the inner cylindrical surface of the bearing seat. The sliding contact portions are located in different latitudinal zones with respect to an axis formed, for example, in the direction in which the ball stud is inserted. At least one of the sliding contact portions includes a plurality of protruding portions arranged along nearly the same latitude. The protruding portion extends toward and contacts the ball head portion. The sliding contact portions elastically deform to create a restoring force which applies a pushing energy to the ball head portion of the ball stud. This configuration allows the ball joint to compensate for friction and dimensional tolerances of the components. When a heavy load is applied, the load is absorbed by the entire bearing seat as a result of the elastic deformation of the sliding contact portions and the load receiving portions. Flexure of the portions between the sliding contact portions and the load receiving portions also contribute support for the heavy load. The load withstanding capability and the durability of the ball joint are therefore improved. Furthermore, the decrease in contact surface area between the bearing seat and the ball head portion reduces the frictional resistance that in turn reduces the ball joint torque. Clearances between the ball head portion and the bearing seat permits the lubricant to cover nearly the entire ball head portion. The increase in lubrication coverage attained allows the ball head portion to slide more easily.

According to another configuration of a ball joint of the invention, some of the protruding portions are formed in a rounded shape. Furthermore, all of the protruding portions may be formed in a rounded shape. The rounded shaped protruding portions contact the ball head portion in a point-contact. This configuration of the ball joint retains the advantages of other configurations while substantially decreasing the contact surface area between the ball head portion the bearing seat. The decreased contact surface area reduces the ball joint torque which permits the ball head portion to slide more easily. Furthermore, when a heavy load is applied to the ball joint the protruding portions are compressed until they form surface-contacts with the ball head portion. The increased contact surface area helps to absorb the heavy load. The ball joint of this configuration has increased durability and can withstand higher loads and increases durability.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A ball joint comprising:

a housing having an inner chamber therein;

said inner chamber including an opening;

a bearing seat in said inner chamber of said housing and having an insertion hole;

a ball stud having a ball head portion adapted to be slidably enveloped by said bearing seat and a stud portion integrally formed with said ball head portion and projecting from said insertion hole;

a plurality of sliding contact portions protruding inward from an inner cylindrical surface of said bearing seat;

said plurality of sliding contact portions being aligned substantially on a circle surrounding said ball head portion at a bottom of said inner cylindrical surface;

spaces between said sliding contact portions forming clearances between said bearing seat and said ball head portion adapted to contain lubricant; and said bearing seat having a second plurality of sliding contacts shaped in strips with trapezoidal cross sections and positioned near a top of said bearing seat with a long azis perpendicular to said bottom.

2. A ball joint according to claim 1, wherein at least some of said protruding portions are rounded in shape.

3. A ball joint according to claim 2, wherein said at least some includes all of said protruding portions are rounded in shape.

4. A ball joint according to claim 1, wherein said bearing seat is of a material having a resilience sufficient to permit said bearing seat to elastically flex and compress when heavily loaded.

5. A ball joint according to claim 1, wherein spaces between at least two of said pluralities of sliding contacts communicate with each other.

6. A ball joint according to claim 1, further comprising a third plurality of sliding contacts rounded in shape and positioned substantially at a top of said ball head portion.

7. A bearing seat comprising:

an inner surface of said bearing seat being deformable into a generally spherical shape to accommodate a ball head portion of a ball stud;

a plurality of inward protrusions on said inner surface to form spaced-apart sliding contacts with said ball head portion;

spaces between said sliding contacts being effective to retain a lubricant;

an outer surface of a bottom of said bearing seat including a plurality of radially disposed spaced-apart load receiving portions adapted for transmitting load forces to a housing containing said bearing seat;

a first sliding contact formed in a substantially circular band positioned at a bottom of said inner surface; and a second plurality of sliding contacts shaped in strips with trapezoidal cross sections and positioned near a top of said bearing seat with a long axis perpendicular to said bottom.

8. A bearing seat according to claim 7, wherein at least some of said inward protrusions are rounded in shape.

9. A bearing seat according to claim 8, wherein said at least some includes all of said inward protrusions are rounded in shape.

10. A bearing seat according to claim 8, wherein said at least some includes some of said protrusions having a rounded cross section and a remainder of said protrusions having a trapezoidal cross section.

11. A bearing seat according to claim 7, wherein at least some of said inward protrusions have a trapezoidal cross section.

12. A bearing seat according to claim 7, wherein at least some of said inward protrusions contact said ball head portion in substantially line-contact.

13. A bearing seat according to claim 12, wherein said at least some includes all of said inward protrusions.

14. A bearing seat according to claim 7, wherein at least some of said inward protrusions contact said ball head portion in substantially point-contact.

15. A bearing seat according to claim 14, wherein said at least some includes all of said inward protrusions.

16. A bearing seat according to claim 7, further comprising an annular groove forming an additional space.

17. A bearing seat according to claim 7, wherein at least some of said load receiving portions are positioned at different radii.

18. A bearing seat according to claim 7, wherein spaces between at least two of said pluralities of sliding contacts all communicate with each other.

19. A bearing seat according to claim 7, further comprising a third plurality of sliding contacts rounded in shape and positioned substantially at a top of said ball head portion.

* * * * *